United States Patent
Li et al.

(10) Patent No.: US 11,707,810 B2
(45) Date of Patent: Jul. 25, 2023

(54) SYSTEM FOR MACHINING AND POSITIONING AUTOMOBILE HUB AND PRODUCTION LINE FOR INTELLIGENT CLEANING AND PRECISION MACHINING

(71) Applicants: QINGDAO UNIVERSITY OF TECHNOLOGY, Shandong (CN); HANERGY (QINGDAO) LUBRICATION TECHNOLOGY CO., LTD., Shandong (CN)

(72) Inventors: Changhe Li, Qingdao (CN); Dewei Liu, Qingdao (CN); Zongming Zhou, Qingdao (CN); Qidong Wu, Qingdao (CN); Bingheng Lu, Qingdao (CN); Bo Liu, Qingdao (CN); Yun Chen, Qingdao (CN); Huajun Cao, Qingdao (CN); Cong Mao, Qingdao (CN)

(73) Assignees: QINGDAO UNIVERSITY OF TECHNOLOGY, Qingdao (CN); HANERGY (QINGDAO) LUBRICATION TECHNOLOGY CO., LTD., Qingdao (CN)

(*) Notice: Subject to any disclaimer, the term of this patent is extended or adjusted under 35 U.S.C. 154(b) by 73 days.

(21) Appl. No.: 17/550,727

(22) Filed: Dec. 14, 2021

(65) Prior Publication Data
US 2023/0042406 A1 Feb. 9, 2023

(30) Foreign Application Priority Data

Aug. 3, 2021 (CN) .......................... 202110885730.4

(51) Int. Cl.
*B23Q 3/06* (2006.01)
*B23P 15/00* (2006.01)
(Continued)

(52) U.S. Cl.
CPC .............. *B23Q 3/062* (2013.01); *B23P 15/00* (2013.01); *B23Q 7/05* (2013.01); *B23Q 7/1426* (2013.01);
(Continued)

(58) Field of Classification Search
CPC ....... B23B 2215/08; B23B 5/02; B23B 31/18; B23Q 3/062
See application file for complete search history.

(56) References Cited

U.S. PATENT DOCUMENTS 6,126,174 A * 10/2000 Reece ................... B23B 31/185
279/2.24
8,707,835 B2 * 4/2014 Bakker ..................... B23B 5/02
82/112
(Continued)

FOREIGN PATENT DOCUMENTS

| CN | 206356951 U | 7/2017 |
| CN | 107838727 A | 3/2018 |
| EP | 3446816 A1 * | 2/2019 ........... B23B 31/021 |

OTHER PUBLICATIONS

EP-3446816-A1 machine translation (Year: 2019).*

*Primary Examiner* — Michael W Hotchkiss
(74) *Attorney, Agent, or Firm* — Oliff PLC

(57) ABSTRACT

A system for machining and positioning an automobile hub and a production line for intelligent cleaning and precision, including upper and lower mounting plates connected vertically. At least three U-shaped blocks are fixed on a top surface of the upper plate. An L-shaped support is mounted between every two blocks, including a screw-equipped ball head disposed thereon. The support is driven by a first driving apparatus to move along the upper mounting plate. A slidable chuck is disposed in each block, with a push rod assembly connected to the bottom. The assembly is driven by a second driving apparatus to move along the upper
(Continued)

mounting plate with the chuck. Three wedges are circumferentially fixed on a top surface of the lower plate and are driven by a third driving apparatus to move along the lower plate. Inclined surfaces of the wedges are mated with bottoms of the push rod assemblies.

10 Claims, 11 Drawing Sheets

(51) Int. Cl.
  *B23Q 7/05* (2006.01)
  *B23Q 7/14* (2006.01)
  *B23Q 11/10* (2006.01)
  *B23B 5/02* (2006.01)
  *B23B 31/18* (2006.01)
(52) U.S. Cl.
  CPC ............... *B23Q 11/10* (2013.01); *B23B 5/02* (2013.01); *B23B 31/18* (2013.01); *B23B 2215/08* (2013.01)

(56) References Cited

U.S. PATENT DOCUMENTS

| | | | |
|---|---|---|---|
| 10,029,314 B1* | 7/2018 | Wu | B23Q 17/006 |
| 10,335,859 B2* | 7/2019 | Liu | G01B 17/02 |
| 10,399,195 B2* | 9/2019 | Liu | B23Q 3/062 |
| 10,525,533 B2* | 1/2020 | Liu | B23B 31/16287 |
| 2003/0000352 A1* | 1/2003 | Caorle | B23B 5/02 82/112 |
| 2003/0132583 A1* | 7/2003 | Grobbel | B23B 31/18 279/132 |
| 2003/0143046 A1* | 7/2003 | Baumgartner | B23B 5/02 279/2.12 |
| 2011/0266733 A1* | 11/2011 | Nix | B23B 5/02 29/559 |
| 2017/0209940 A1* | 7/2017 | Guo | B23B 31/26 |
| 2017/0312833 A1* | 11/2017 | Guo | B23B 31/30 |
| 2017/0312834 A1* | 11/2017 | Guo | B23B 31/185 |
| 2018/0354041 A1* | 12/2018 | Yang | B23B 31/18 |
| 2019/0160545 A1* | 5/2019 | Liu | B23B 31/18 |
| 2020/0198022 A1* | 6/2020 | Liu | G01M 17/021 |

* cited by examiner

SYSTEM FOR MACHINING AND POSITIONING AUTOMOBILE HUB AND PRODUCTION LINE FOR INTELLIGENT CLEANING AND PRECISION MACHINING

TECHNICAL FIELD

The present invention relates to the technical field of machining devices, and specifically, to a system for positioning an automobile hub and a production line for intelligent cleaning and precision machining of an automobile hub including the positioning system.

BACKGROUND

Currently, hub positioning in the field of automobile hub machining has relatively large errors, severely affecting the hub machining precision. Therefore, clamping of hubs of different sizes cannot be achieved, resulting in extremely low flexibility of the hub machining unit. For example, the invention CN201711405456.6 discloses an automobile hub fixture. The fixture drives, by using the telescopic rod, the clamping member to clamp a hub rim, and adapts to hubs of different sizes by controlling the rotation and elevation of the hub platform. However, controlling the rotation and elevation of the hub platform to adapt to hubs of different sizes easily causes a relatively large positioning precision error. In addition, the clamping groove on the clamping member is not adaptive, and the thickness of the hub rim is relatively small. Therefore, the clamping force of the clamping member on the hub is excessively concentrated, easily resulting in deformation or unreliable clamping of the hub. For another example, the utility model CN201720017875.1 discloses a hub fixture. In the fixture, the position of the pulling arm is required to be manually adjusted according to the size of the hub, and cannot be automatically adjusted. Only one pulling claw can be manually adjusted each time. Therefore, three pulling claws cannot be radially moved simultaneously, resulting in a relatively large positioning error.

The flexible machining of automobile hubs cannot be realized as a result of the limitation of the hub fixture. Therefore, one machining unit can be used for machining hubs of only one specification. When hubs of different sizes and specifications are to be machined, the fixture needs to be replaced manually, and corresponding machining programs are required to be manually written. Since shutdown is required during replacement of the fixture and the machining program, the machining efficiency is greatly affected.

In addition, currently, in the automobile hub production line, conventional pouring lubrication is still used, causing large consumption and wastes of cutting fluids. Machining costs are excessively high, the physical health of workers is severely affected, long-term exposure to the cutting fluids easily causes physical diseases, and the large consumption of the cutting fluids severely pollutes the environment.

SUMMARY

In view of the disadvantages of the prior art, the present invention is intended to provide a new system for positioning an automobile hub and a production line for intelligent cleaning and precision machining of an automobile hub including the fixture.

To achieve the foregoing objective, the present invention is implemented by the following technical solutions:

In a first aspect, the present invention provides a system for positioning an automobile hub. The system includes an upper mounting plate and a lower mounting plate. The upper mounting plate and the lower mounting plate are connected and spaced apart by a specific distance.

At least three U-shaped blocks are circumferentially fixed on a top surface of the upper mounting plate. A first linear guide rail is fixed between every two adjacent U-shaped blocks, and is disposed radially along the upper mounting plate. An L-shaped support is mounted to each first linear guide rail. A screw-equipped ball head is disposed on the L-shaped support. The L-shaped support is driven by a first driving apparatus. A second linear guide rail is fixed in each U-shaped block. A collet slidable along the second linear guide rail is mounted to the second linear guide rail. A top bar assembly is further connected to a bottom of each collet. The top bar assembly is driven by a second driving apparatus to move radially along the upper mounting plate.

Three wedges are circumferentially fixed on a top surface of the lower mounting plate. The three wedges are driven by a third driving apparatus to move radially along the lower mounting plate. Inclined surfaces of the wedges are mated with the top bar assemblies, so that the top bar assemblies can move up and down, thereby tilting the collets.

Further, the top bar assembly includes an outer housing, an end cover, a spring, an outer top bar, an inner top bar, a connecting member, and a roller. The end cover is fixed on a top surface of the outer housing. The inner top bar is mounted in the outer top bar. The outer top bar is sleeved on the inner top bar through a central deep hole and is axially positioned by using a shaft collar of the inner top bar. The spring is coaxially mated with the outer top bar, and is axially positioned by using the shaft collar of the inner top bar. The outer top bar penetrates the end cover to be connected to the collet. A lower end of the inner top bar protrudes from the outer housing to be fixedly connected to the connecting member. The roller is mounted to the connecting member.

Further, through grooves are provided on the end cover. A plurality of rollers are mounted in each through groove in an up-down direction, and are connected to the end cover. Therefore, friction between the end cover and an upper surface and a lower surface of an inner groove in the upper mounting plate is changed to rolling friction.

A roller is mounted to a bottom of the above inner top bar, to achieve rolling friction between the top bar assembly and the wedge, thereby reducing friction between the apparatuses. A roller is mounted to the end cover of the top bar assembly, so that sliding friction between the end cover of the top bar assembly and the upper surface and the lower surface of the inner groove in the upper mounting plate is changed to rolling friction. In this way, the resistance and the abrasion of apparatuses are reduced.

Further, the first driving apparatus includes a steering engine mounted to a center of the upper mounting plate. A steering engine arm is mounted to the steering engine. A flange plate is fixedly connected to the steering engine arm and is connected to the L-shaped supports by using a link. The steering engine arm, the flange plate, the link, the L-shaped support, a slidable base, and the first linear guide rail jointly form a slider-crank mechanism. When the steering engine drives the steering engine arm and thereby drives the flange plate to rotate by a specific angle, the flange plate can drive the three links and thereby drive the three L-shaped supports fixed on the slidable base to simultaneously move linearly along the linear guide rails. Therefore, the three L-shaped supports drive the screw-equipped ball heads to move. The screw-equipped ball heads mounted to the L-shaped supports come into contact with a surface of an inner rim of a hub to limit the movement of the hub along an X axis and a Y axis. The rotation of the hub along a Z axis does not need to be limited during the turning of the hub in a first horizontal lathe. By means of the positioning apparatus, the self-positioning of hubs of different sizes can be realized.

Further, the second driving apparatus includes a steering engine mounted to a center of the lower mounting plate, a steering engine arm is mounted to the steering engine. A reel is fixedly connected to the steering engine arm, a connecting member is fixedly mounted to the reel. One end of each link is connected to the connecting member, and an other end of the each link is connected to the outer housing of the top bar assembly. The steering engine, the steering engine arm, the reel, the connecting member, the link, and the top bar assembly jointly form a slider-crank mechanism. When the steering engine drives the steering engine arm to rotate and thereby drives the connecting member on the reel to rotate, the connecting member drives the three top bar assemblies to move linearly by using the three links. The three top bar assemblies are respectively connected to the three collets. In this way, the three collets simultaneously move linearly with the top bar assemblies.

As a further technical solution, three square grooves are circumferentially provided on the lower mounting plate. A linear guide rail is fixed in each of the three square grooves. A slider is disposed on the linear guide rail. The wedges are fixedly connected to the sliders. Working plates are mounted to bottom surfaces of the sliders. A thickness of each working plate is a vertical distance from the bottom surface of each slider to a bottom surface of the lower mounting plate. A cylindrical boss is disposed at a center of the bottom surface of the lower mounting plate. A disc is mated with the cylindrical boss. One ends of the three links are connected to the disc, and other ends of the links are connected to the three working plates. A cylinder is fixed on the lower mounting plate. A piston rod of the cylinder is connected to the wedges. In this way, the cylinder, the wedge, the slider, the working plate, the link, and the disc jointly form a slider-crank mechanism. When the piston rod of the cylinder pushes one of the three wedges to move along the linear guide rail, the working plate mounted to the bottom surface of the slider drives the link and thereby drives the disc to rotate. By means of the slider-crank mechanism, the disc causes the other two wedges to simultaneously move linearly along the linear guide rails respectively.

In a second aspect, the present invention further provides a production line for intelligent cleaning and precision machining of an automobile hub. The production line includes the system for positioning an automobile hub.

Further, the production line for intelligent cleaning and precision machining of an automobile hub further includes a micro-lubrication apparatus. The micro-lubrication apparatus includes a nozzle, a pneumatic frequency generator, a solenoid valve, a tee joint, a micro pneumatic pump, an oil cup, and a liquid level sensor. A pipeline passes through the solenoid valve and is divided into two paths by the tee joint. One path directly communicates with the nozzle, an other path passes through the pneumatic frequency generator and then communicates with the micro pneumatic pump. The solenoid valve is configured to control a gas path to open or close. The micro pneumatic pump is configured to pump a small amount of lubricating oil. The pneumatic frequency generator is configured to generate an electrical signal to control the micro pneumatic pump to turn on/off. The liquid level sensor is mounted in the oil cup to detect an oil level of the oil cup.

Further, the production line for intelligent cleaning and precision machining of an automobile hub further includes an unloading rack, a first robot, a loading rack, a second robot, an automatic hub three-dimensional scanning apparatus, a first horizontal lathe, a second horizontal lathe, and a machining center. The unloading rack, the first horizontal lathe, the second horizontal lathe, the machining center, and the automatic hub three-dimensional scanning apparatus are circumferentially arranged around the second robot. Linear distances between the second robot and the first horizontal lathe, the second horizontal lathe, and the machining center are a same fixed value. The loading rack and the first robot are disposed beside the automatic hub three-dimensional scanning apparatus, and the system for positioning an automobile hub is mounted in the first horizontal lathe.

Beneficial effects of the present invention are as follows:

(1). A fixture in the present invention is mainly composed of a positioning mechanism and a clamping mechanism. A positioning apparatus includes the slider-crank mechanism composed of the U-shaped blocks, the steering engine, the links, the L-shaped supports, the slidable base, and the linear guide rails. A lower surface of a hub is used as a positioning reference surface for contact with upper surfaces of the U-shaped blocks, to limit the rotation of the hub along the X axis and the Y axis and the movement along the Z axis. The steering engine is used as a power source for the slider-crank mechanism, and causes the three L-shaped supports to radially moved from inside to outside simultaneously. The screw-equipped ball heads mounted to the L-shaped supports come into contact with a surface of an inner rim of the hub to limit the movement of the hub along the X axis and the Y axis. The rotation of the hub along the Z axis does not need to be limited during the turning of the hub in the first horizontal lathe. By means of the positioning apparatus, the self-positioning of hubs of different sizes can be realized. The clamping mechanism includes a wedge mechanism and a slider-crank mechanism composed of the steering engine, the top bar assemblies, the collets, the sliders, the linear guide rails, and the links. The slider-crank mechanism uses the steering engine as a power source. By means of the slider-crank mechanism, a clamping apparatus can clamp hubs of different sizes. By means of the wedge mechanism, a clamping force can be perpendicular to a main positioning surface, so that reliable clamping is achieved, thereby improving the machining precision of the hubs. In addition, by means of the wedge mechanism, a large clamping increase ratio is achieved, and desirable self-locking performance is realized.

(2). By means of the hub fixture of the present invention, self-positioning and clamping of hubs of different sizes can be achieved. The clamping force is perpendicular to the positioning reference surface. Therefore, reliable clamping is realized, and the machining precision of the hubs is improved. The fixture has a strong adaptability, and therefore can be used for production of hubs of different types by using one machining unit.

(3). According to the present invention, the entire production line includes the micro-lubrication apparatus. A computer controls the micro-lubrication apparatus to start according to an automatically planned machining program, so that the micro-lubrication apparatus can be precisely and timely started according to the machining program, and spray a minimal quantity of cutting fluids to a cutting area between a hub and a cutter. In this way, the cutting fluid is saved, the environment is protected, and the machining precision of the hub is improved. By means of the micro-lubrication system in the production line for intelligent cleaning and precision machining of an automobile hub, the consumption of the cutting fluid is greatly reduced, the machining precision of the hub is improved, the machining costs are reduced, and the environment of a machining workshop is improved.

(4). The liquid level sensor in the oil cup of the micro-lubrication apparatus monitors a lubricating oil level in the oil cup. If the lubricating oil is insufficient, the computer controls an oil supply tank of the micro-lubrication apparatus to supply oil to the oil cup of the micro-lubrication apparatus, so that the micro-lubrication apparatus automatically achieves supply of the lubricating oil without manually injection of oil. In this way, the automation efficiency and the production efficiency of the production line are enhanced.

(5). The production line for intelligent cleaning and precision machining of an automobile hub in the present invention is highly automated, and has a complete automatic loading and unloading apparatus and three-dimensional scanning apparatus. Thus, automatic loading and unloading of hubs can be realized, and the machining program can be automatically written according to three-dimensional scanning data. Since the hubs do not need to be manually carried, and the machining program of the machining unit does not need to be manually changed, manpower can be saved.

Loading rack I-1, First robot II-1, Unloading rack I-2, Second robot II-2, Automatic hub three-dimensional scanning apparatus III, First horizontal lathe IV-1, Second horizontal lathe IV-2, Machining center V, Micro-lubricating oil supply tank VI-1, micro-lubrication apparatus VI-2, Positioning system VII, Protective fence VIII, Hub workblank IX, Triangular mounting plate VII-1, Steering engine VII-2, Steering engine arm VII-3, Flange plate VII-4, Link VII-5, Ball head with screw VII-6, L-shaped support VII-7, Slidable base VII-8, Lower mounting plate VII-9, Upper mounting plate VII-10, Right-angled mounting plate VII-11, Link VII-12, Cylinder VII-13, Flange VII-14, Steering engine arm VII-15, Disc VII-16, steering engine VII-17, Reel VII-18, Connecting member VII-19, Link VII-20, Working plate VII-21, Slider VII-22, Wedge VII-23, Top bar assembly VII-24, Collet VII-25, U-shaped block VII-26, Slider VII-27, Threaded pin VII-28, Counterweight VII-29, Right-angled mounting plate VII-30, Right-angled mounting plate VII-31, Right-angled mounting plate VII-32, Square groove VII-10-1, Square groove VII-10-2, Inner groove VII-10-3, Outer housing VII-24-3, End cover VII-24-1, Spring VII-24-2, Outer top bar VII-24-4, Inner top bar VII-24-5, Connecting member VII-24-7, Roller VII-24-6, Roller VII-24-8.

Nozzle VI-2-1, Pneumatic frequency generator VI-2-2, Solenoid valve VI-2-3, Tee joint VI-2-4, Micro pneumatic pump VI-2-5, Oil cup VI-2-6, Liquid level sensor VI-2-7, Tank body VI-2-8.

Tank body VI-1-1, Tank cover VI-1-2, Solenoid valve VI-1-3, Liquid level controller VI-1-6, Hydraulic oil pump-specific motor VI-1-4, Hydraulic oil pump VI-1-5, Hub workblank IX, Lower surface IX-1, Hub rim upper surface IX-2.

DETAILED DESCRIPTION

Figure 1:
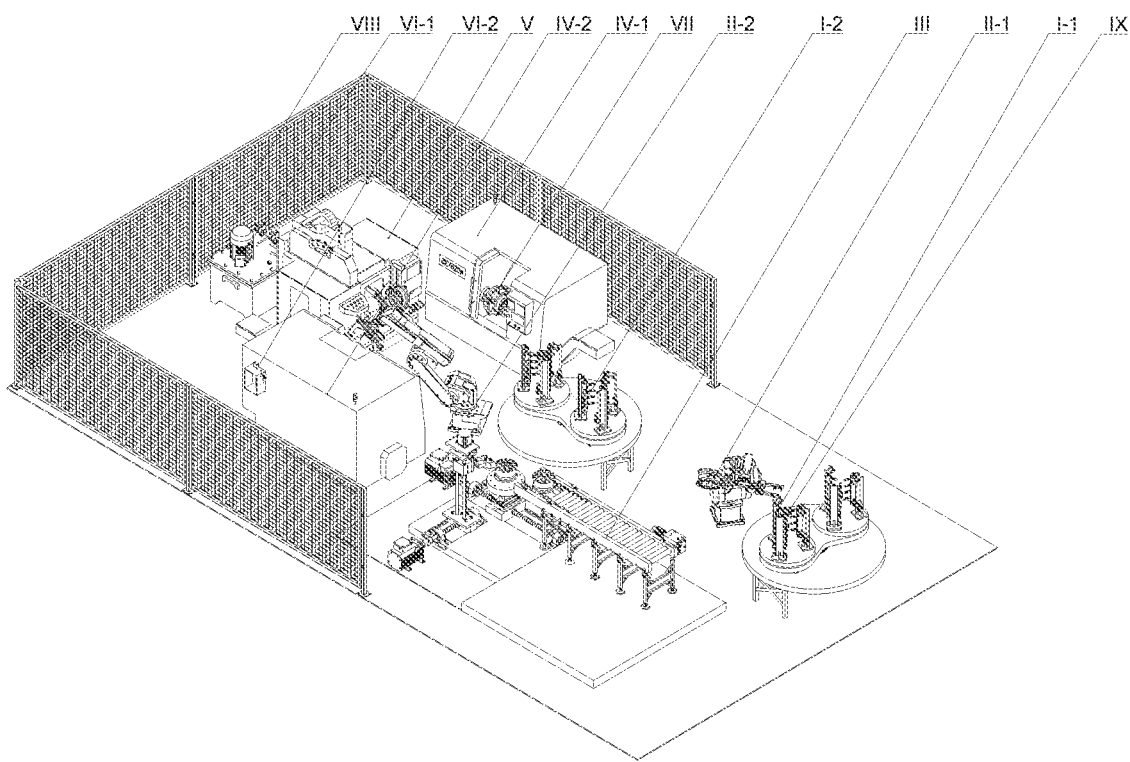
FIG. 1 is an axonometric drawing of a production line for intelligent cleaning and precision machining of an automobile hub.

As shown in FIG. 1, a production line for cleaning and precision machining of an automobile hub provided in this embodiment is composed of a loading rack I-1, a unloading rack I-2, a first robot II-1, a second robot II-2, an automatic hub three-dimensional scanning apparatus III, a first horizontal lathe IV-1, a second horizontal lathe IV-2, a machining center V, a micro-lubricating oil supply tank VI-1, a micro-lubrication apparatus VI-2, a positioning system VII, and a protective fence VIII.

The protective fence VIII is disposed outside the first horizontal lathe IV-1, the second horizontal lathe IV-2, and the micro-lubricating oil supply tank VI-1. The unloading rack I-2, the first horizontal lathe IV-1, the second horizontal lathe IV-2, the machining center V, and the automatic hub three-dimensional scanning apparatus III are circumferentially arranged along the second robot II-2. Linear distances between the second robot II-2 and the first horizontal lathe IV-1, the second horizontal lathe IV-2, and the machining center V are a same fixed value. The loading rack I-1 and the first robot II-1 are disposed beside the automatic hub three-dimensional scanning apparatus III. The micro-lubricating oil supply tank VI-1 is disposed behind the machining center V. The micro-lubrication apparatuses VI-2 is mounted behind the first horizontal lathe IV-1, the second horizontal lathe IV-2, and the machining center V. The positioning system VII is mounted in the first horizontal lathe IV-1. The protective fence VIII is disposed around the first horizontal lathe IV-1, the second horizontal lathe IV-2, and the micro-lubricating oil supply tank VI-1. It is to be noted that, the first robot II-1 has a same structure as the second robot II-2, and the loading rack I-1 has a same structure as the unloading rack I-2.

Specifically, the loading rack I-1 is configured to temporarily store a hub workblank IX, convey the hub workblank IX to a designated position for loading, and position the hub workblank IX to assist the first robot II-1 in loading. The first robot II-1 is configured to carry the hub workblank IX to a roller table of the automatic hub three-dimensional scanning apparatus III from the loading rack I-1. The automatic hub three-dimensional scanning apparatus III is configured to perform three-dimensional scanning on the hub workblank IX, and automatically export a numerically-controlled machine tool machining program. The second robot II-2 is configured to carry the hub workblank IX to the first horizontal lathe IV-1 for machining from a clamping apparatus of the automatic hub three-dimensional scanning apparatus III, carry the hub workblank IX to the second horizontal lathe IV-2 and the machining center V successively after completion of the machining for finish machining, and carry the hub workblank IX to the unloading rack I-2 for temporary storage after completion of the finish machining. The unloading rack I-2 is configured for temporary storage of wheel blanks IX after finishing, with the second robot II-2 to realize the downfeed. The micro-lubricating oil supply tank VI-1 is configured to supply oil to the micro-lubrication apparatus VI-2. The micro-lubrication apparatus VI-2 is configured to provide cooling and lubrication for machining of a hub. The positioning system VII is configured to position and clamp the hub workblank IX during machining in the machine tool. The protective fence VIII is configured to protect machining devices and prevent strayed persons from being damaged.

Table 1 shows a process route plan for machining the hub workblank IX. After the hub workblank IX is scanned by the automatic hub three-dimensional scanning apparatus III, a computer controls the second robot II-2 to carry the hub workblank IX to the positioning system VII in the machining tool of each machining apparatus according to the process route plan for positioning and clamping. Then the machining devices perform machining according to a machining route planned by the computer. The positioning system VII in this embodiment is designed for a process 10 and a process 30.

Figure 2:
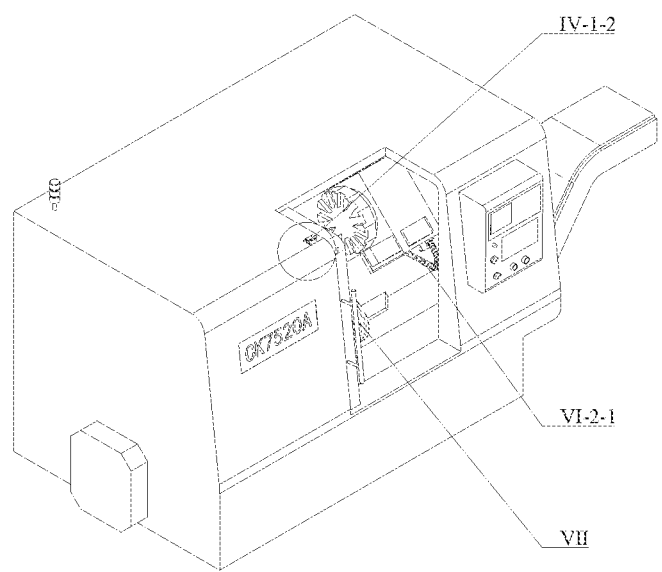
FIG. 2 is an axonometric drawing of a first horizontal lathe.
Figure 3:
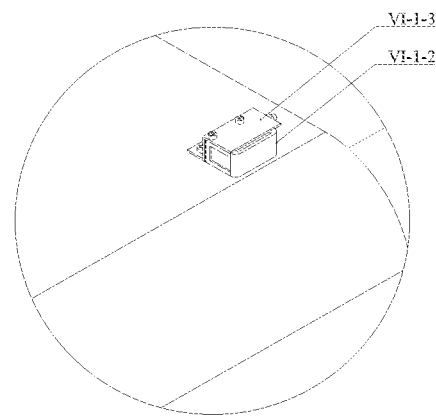
FIG. 3 is a partial enlarged view of a first horizontal lathe.
Figure 4:
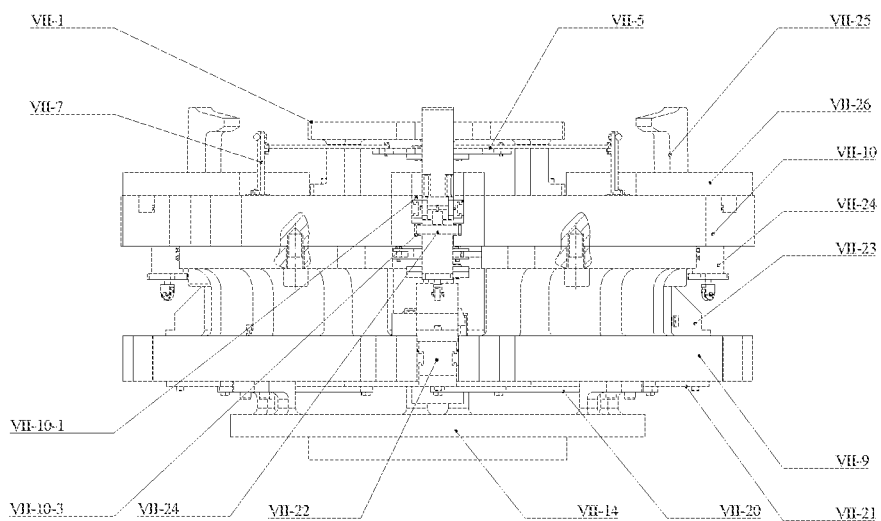
FIG. 4 is a partial cross-sectional view of a positioning system.

As shown in FIG. 2 and FIG. 3, the positioning system VII is mounted to a main shaft of the first horizontal lathe IV-1. A diffuse reflection photoelectric sensor IV-1-2 is disposed on the first horizontal lathe IV-1. The diffuse reflection photoelectric sensor IV-1-2 is mounted to the first horizontal lathe IV-1 by using a right-angled mounting plate IV-1-3. The diffuse reflection photoelectric sensor IV-1-2 is configured to monitor a position of the second robot II-2, so as to control a door of the first horizontal lathe IV-1 to open or close. A nozzle VI-2-1 of the micro-lubrication apparatus VI-2 is mounted to a turret of the first horizontal lathe IV-1, and is configured to spray a cooling liquid to the hub workblank IX during the machining. It is to be noted that, the diffuse reflection photoelectric sensor IV-1-2 and the nozzle VI-2-1 are also disposed on the second horizontal lathe IV-2 and the machining center V.

As shown in FIG. 4 to FIG. 11, a hub positioning system provided in this embodiment includes a triangular mounting plate VII-1, a steering engine VII-2, a steering engine arm VII-3, a flange plate VII-4, a link VII-5, a screw-equipped ball head VII-6, an L-shaped support VII-7, a slidable base VII-8, an upper mounting plate VII-10, a lower mounting plate VII-9, a right-angled mounting plate VII-11, a link VII-12, a cylinder VII-13, a steering engine arm VII-15, a disc VII-16, a steering engine VII-17, a reel VII-18, a connecting member VII-19, a link VII-20, a working plate VII-21, a slider VII-22, a wedge VII-23, a top bar assembly VII-24, a collet VII-25, a U-shaped block VII-26, a slider VII-27, an I-shaped counterweight VII-29, a right-angled mounting plate VII-30, a right-angled mounting plate VII-31, and a right-angled mounting plate VII-32. In this embodiment, three collets VII-25, three U-shaped blocks VII-26, and three L-shaped supports VII-7 are provided, for example. It is easily understood that, quantities of the components each may also be four, five, or the like, but preferably, three.

Three square grooves VII-10-2 configured to mount a positioning apparatus and three square grooves VII-10-1 configured to mount a clamping apparatus are circumferentially arranged on the upper mounting plate VII-10. An included angle between central axes of every two square grooves is 120°. A square groove for mounting the steering engine VII-2 is provided in a center of the upper mounting plate VII-10.

Two positioning holes are drilled in each square groove VII-10-2 of the upper mounting plate VII-10. A cylindrical pin is disposed in each positioning hole and configured to mount a linear guide rail. The linear guide rails are fixedly connected to the square grooves VII-10-2. A slidable base VII-8 is mounted to the linear guide rail. The slidable base VII-8 is slidable linearly along the linear guide rail. The slidable base VII-8 is fixedly connected to one of the L-shaped supports VII-7. The screw-equipped ball head VII-6 is fixedly connected to each of the L-shaped support VII-7. The steering engine VII-2 is mounted in the square groove in the center of the upper mounting plate VII-10, and is fixedly connected to the upper mounting plate VII-10 by using two right-angled mounting plate VII-11.

The steering engine arm VII-3 is mounted to the steering engine VII-2. The flange plate VII-4 is fixedly connected to the steering engine arm VII-3. The flange plate VII-4 is connected to the link VII-5 by means of the L-shaped support VII-7. One end of the link VII-5 is hinged to the flange plate VII-4, and an other end of the link is hinged to the L-shaped support VII-7. The steering engine arm VII-3, the flange plate VII-4, the link VII-5, the L-shaped support VII-7, and the slidable base VII-8 jointly form a slider-crank mechanism. When the steering engine VII-2 drives the steering engine arm VII-3, the flange plate VII-4 can be driven to rotate by a specific angle, and the flange plate VII-4 can drive the three links VII-5 to drive the three L-shaped supports VII-7 fixed on the slidable base VII-8 to simultaneously move linearly along the linear guide rails, thereby causing the three L-shaped supports VII-7 to move tother with the screw-equipped ball heads VII-6. The screw-equipped ball heads VII-6 mounted to the L-shaped supports VII-7 come into contact with a surface of an inner rim of the hub to limit the movement of the hub workblank IX along an X axis and a Y axis. The rotation of the hub workblank IX along a Z axis does not need to be limited during the turning of the hub in the first horizontal lathe IV-1. By means of the positioning apparatus, the self-positioning of hub workblanks IX of different sizes can be realized.

The triangular mounting plate VII-1 is mounted to the center of the upper mounting plate VII-10. The triangular mounting plate VII-1 is configured to prevent aluminum scraps generated during the machining of the hub workblank IX from sputtering on the steering engine VII-2 and causing structural damage and thus affecting the machining efficiency.

Three U-shaped blocks VII-26 are mounted to the upper mounting plate VII-10. The U-shaped blocks VII-26 are mounted along the square grooves VII-10-1 respectively. The U-shaped blocks VII-26 are fixedly connected to the upper mounting plate VII-10. Since the U-shaped blocks VII-26 are used as a positioning element, an upper surface and a lower surface of each U-shaped block VII-26 and a surface of the upper mounting plate VII-10 that is configured for contact with the U-shaped block VII-26 are required to be finely machined to obtain a relatively high surface roughness. The upper surfaces of the three U-shaped blocks VII-26 after mounting are required to be on a same horizontal plane. Two positioning holes are drilled on an inner wall of each of two ends of each of the three square grooves VII-10-1 of the upper mounting plate VII-10. The positioning holes and the cylindrical pins are in interference fit to mount the linear guide rail.

Two linear guide rails are mounted to the inner wall of each of the two ends of the each square groove VII-10-1. The sliders VII-27 are mounted to the linear guide rails respectively. The sliders VII-27 are slidable linearly along the linear guide rails. Through holes VII-25-1 on the collet VII-25 are hinged to center holes on the two sliders VII-27. The collet VII-25 mounted on the slider VII-27 can slide along the linear guide in a straight line and can be rotated at a certain angle. A threaded pin VII-28 passes through the two through holes VII-25-2 in collet VII-25 and the through hole in the outer top bar VII-24-4 of the top bar assembly VII-24, and is secured by twisting the hexagonal nut at both ends. Two ends of the threaded pin are fastened by using hex nuts. An end cover VII-24-1 of the top bar assembly VII-24 is matedly mounted to an inner groove VII-10-3 on the upper mounting plate. Inner walls on two ends of the inner groove VII-10-3 on the upper mounting plate VII-10 limit the end cover VII-24-1 of the top bar assembly VII-24 in left and right directions. Therefore, the through hole on the outer top bar VII-24-4 of the top bar assembly VII-24 is required to be located at a midpoint of a line connecting centers of the two through holes VII-25-2 on the collet VII-25. It is to be noted that, a front end of the collet VII-25 needs to be wrapped with a rubber material.

The lower mounting plate VII-9 is fixedly connected to the upper mounting plate VII-10. A square groove same as that on the upper mounting plate VII-10 is provided in a center of the lower mounting plate VII-9. A steering engine VII-17 is mounted in the square groove. The steering engine VII-17 is mounted to the square groove in the center of the lower mounting plate VII-9 in a manner same as the manner of mounting the steering engine VII-2 to the square groove in the center of the upper mounting plate VII-10. The steering engine arm VII-15 is mounted to the steering engine VII-17. The reel VII-18 is fixedly connected to the steering engine arm VII-15. The connecting member VII-19 is mounted to the reel VII-18, and is axially positioned by using a shaft sleeve. The connecting member is axially fixed by using a locking check ring, and is circumferentially fixed by using a round end key.

One end of the link VII-12 is hinged to the connecting member VII-19, and an other end of the link is hinged to an upper lug of an outer housing VII-24-3 of the top bar assembly VII-24.

The steering engine VII-17, the steering engine arm VII-15, the reel VII-18, the connecting member VII-19, the link VII-12, and the top bar assembly VII-24 jointly form a slider-crank mechanism. When the steering engine VII-17 drives the steering engine arm VII-15 to rotate and thereby drives the connecting member VII-19 on the reel VII-18 to rotate, the connecting member VII-19 drives the three top bar assemblies VII-24 to move linearly by using the three links VII-12. The three top bar assemblies VII-24 are respectively connected to the three collets VII-25. In this way, the three collets VII-25 simultaneously move linearly with the top bar assemblies VII-24.

Three square grooves are circumferentially provided on the lower mounting plate VII-9. Two positioning holes are drilled on an inner wall of each of two ends of each of the three square grooves to mount of the linear guide rail. The linear guide rail is fixedly connected to the inner wall of the each square groove of the lower mounting plate VII-9. The slider VII-22 is mounted to the linear guide rail. The wedge VII-23 is fixedly connected to the slider VII-22.

A working plate VII-21 is mounted to a bottom surface of the slider VII-22. A thickness of the working plate VII-21 is a vertical distance from the bottom surface of the slider VII-22 to a bottom surface of the lower mounting plate VII-9 The working plate VII-21 is fixedly connected to the slider VII-22.

A circular groove is provided at a center of the bottom surface of the lower mounting plate VII-9. A cylindrical boss is disposed at a center of the circular groove. A center hole of the disc VII-16 is coaxial and in clearance fit with the cylindrical boss. The disc is axially positioned by using a shaft sleeve. The disc is axially fixed by using a locking check ring. One ends of the three links VII-20 are hinged to the disc VII-16, and other ends of the links are hinged to the three working plates VII-21. The cylinder VII-13 is fixedly mounted to the lower mounting plate VII-9 by using the right-angled mounting plates VII-30 and VII-31. A piston rod of the cylinder VII-13 is fixedly connected to the wedge VII-23 by using the right-angled mounting plate VII-32. In this way, the cylinder VII-13, the wedge VII-23, the slider VII-22, the working plate VII-21, the link VII-20, and the disc VII-16 jointly form a slider-crank mechanism. When the piston rod of the cylinder VII-13 pushes one of the three wedges VII-23 to move along the linear guide rail, the working plate VII-21 mounted to the bottom surface of the slider VII-22 drives the link VII-20 and thereby drives the disc VII-16 to rotate. By means of the slider-crank mechanism, the disc VII-16 causes the other two wedges VII-23 to simultaneously move linearly along the linear guide rails respectively.

The flange VII-14 is disposed at a bottom of the lower mounting plate VII-9, and is configured to connect the positioning system VII to a main shaft of the machine tool.

Figure 12:
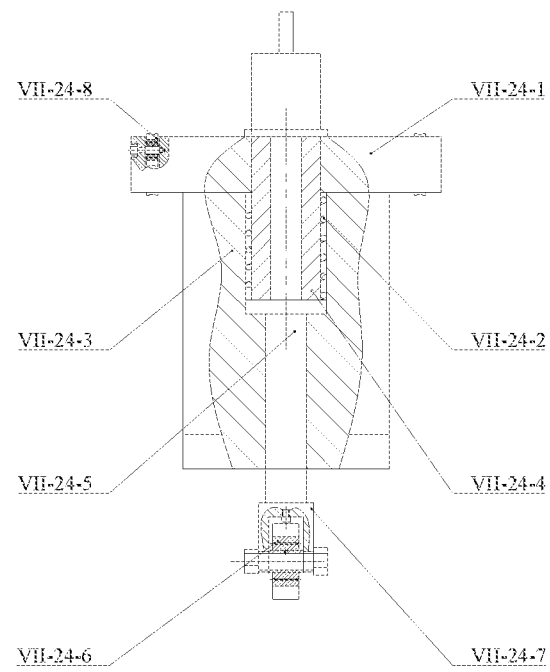
FIG. 12 is a partial cross-sectional view of a top bar assembly.

As shown in FIG. 12, the top bar assembly VII-24 includes an outer housing VII-24-3, an end cover VII-24-1, a spring VII-24-2, an outer top bar VII-24-4, an inner top bar VII-24-5, a connecting member VII-24-7, a roller VII-24-6, and a roller VII-24-8.

The inner top bar VII-24-5 is disposed in a stepped hole of the outer housing VII-24-3. The outer top bar VII-24-4 is sleeved on the inner top bar VII-24-5 through a central threaded hole, and is axially positioned by using a shaft collar of the inner top bar VII-24-5. The spring VII-24-2 is coaxially mated with the outer top bar VII-24-4, and is axially positioned by using the shaft collar of the inner top bar VII-24-5. The outer top bar VII-24-4 penetrates a through hole at a center of the end cover VII-24-1 to be connected to the collet VII-25 by using the threaded pin VII-28. The end cover VII-24-1 is fixedly connected to the outer housing VII-24-3. A lower end of the inner top bar VII-24-5 protrudes from the outer housing VII-24-3 to be fixedly connected to the connecting member VII-24-7. The roller VII-24-6 is mounted to the connecting member VII-24-7. Two through grooves are provided on the end cover VII-24-1. Four rollers VII-24-8 are symmetrically disposed in one through groove two by two in an up-down direction. In this way, friction between the end cover VII-24-8-1 and an upper surface and a lower surface of the inner groove VII-10-3 on the upper mounting plate VII-10 can be changed to rolling friction.

Figure 7:
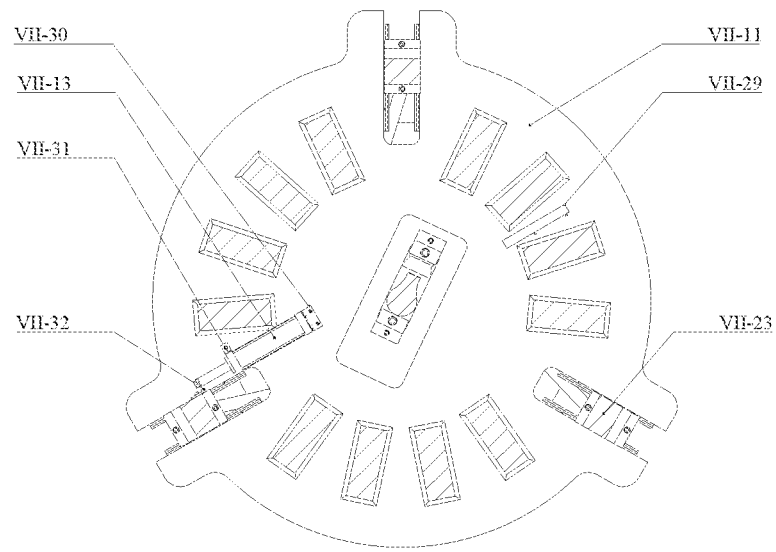
FIG. 7 is a cross-sectional view of a positioning system.
Figure 8:
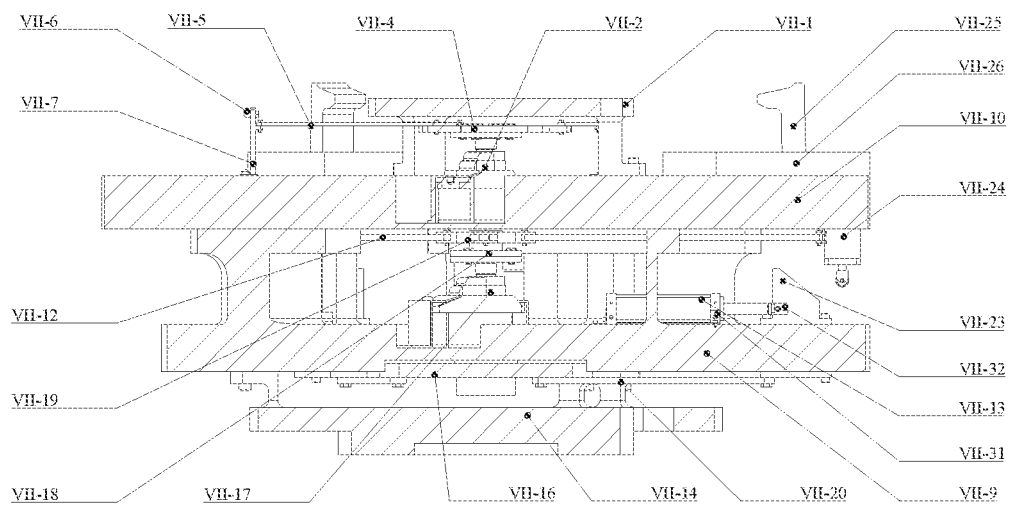
FIG. 8 is a cross-sectional view of a positioning system.
Figure 9:
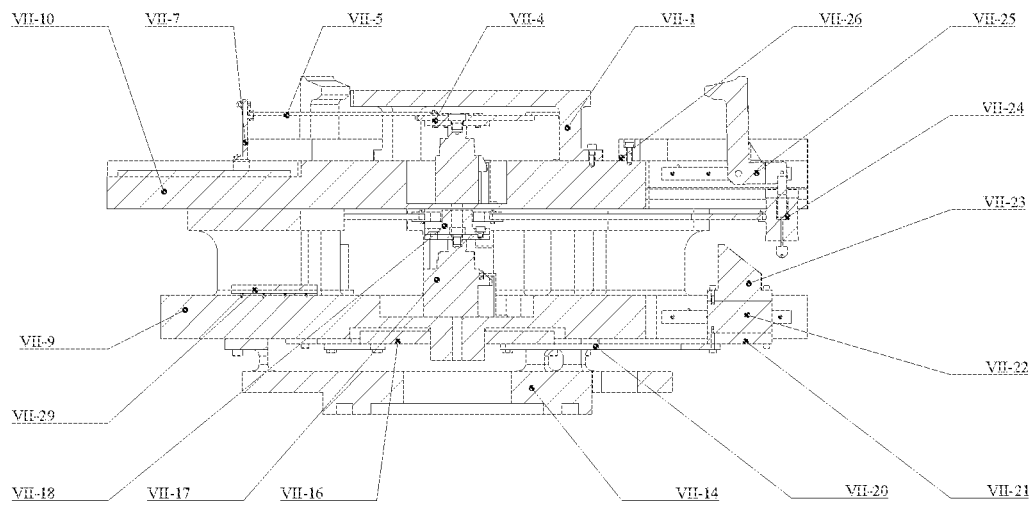
FIG. 9 is a cross-sectional view of a positioning system.
Figure 10:
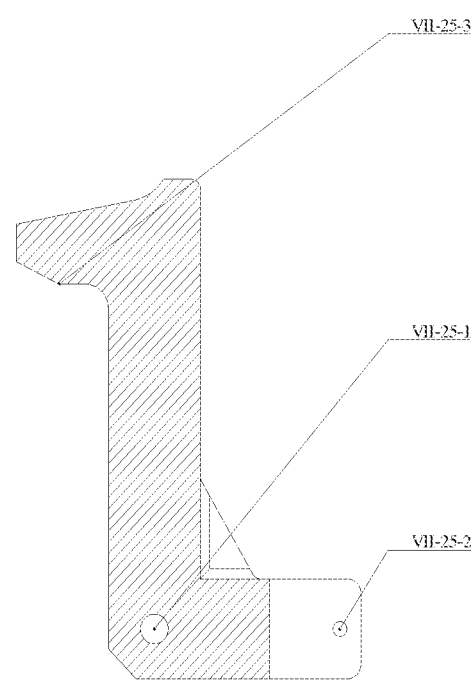
FIG. 10 is a cross-sectional view of a collet.
Figure 11:
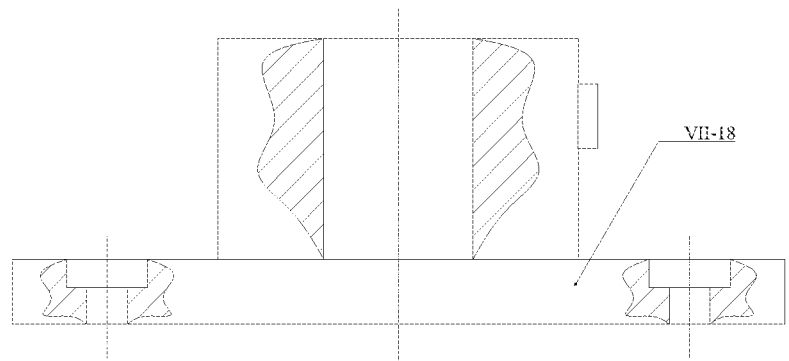
FIG. 11 is a cross-sectional view of a reel.
Figure 13:
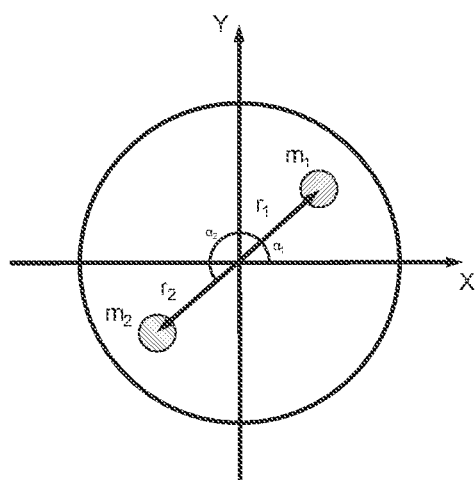
FIG. 13 is a calculation model for a static balance of a lower mounting plate.

As shown in FIG. 13 and FIG. 7, in order to prevent static unbalance of the positioning system VII as a result of an eccentric mass generated by the cylinder VII-13, a counterweight VII-29 is required to be mounted to the lower mounting plate VII-9 to achieve static balance of the positioning system VII. A mass of the cylinder VII-13 is $m_1$, a turning radius of the cylinder VII-13 is $r_1$, $\alpha_i$ is an included angle (measured from the x axis in a counterclockwise direction) between a radius vector $r_i$ and an x axis. A static balance condition is $m_1r_1+m_2r_2=0$, and $\alpha_2=\alpha_1+180°$. If a mass of the I-shaped counterweight VII-29 is $m_2$, $r_2$ can be determined. Thus, a mounting position of the I-shaped counterweight VII-29 on the lower mounting plate VII-9 can be determined. Accordingly, two positioning holes are drilled on the lower mounting plate VII-9, and are in interference fit with the pin, so as to mount the I-shaped counterweight VII-29 to the lower mounting plate VII-9. The I-shaped counterweight VII-29 is fixedly connected to the lower mounting plate VII-9.

Figure 5:
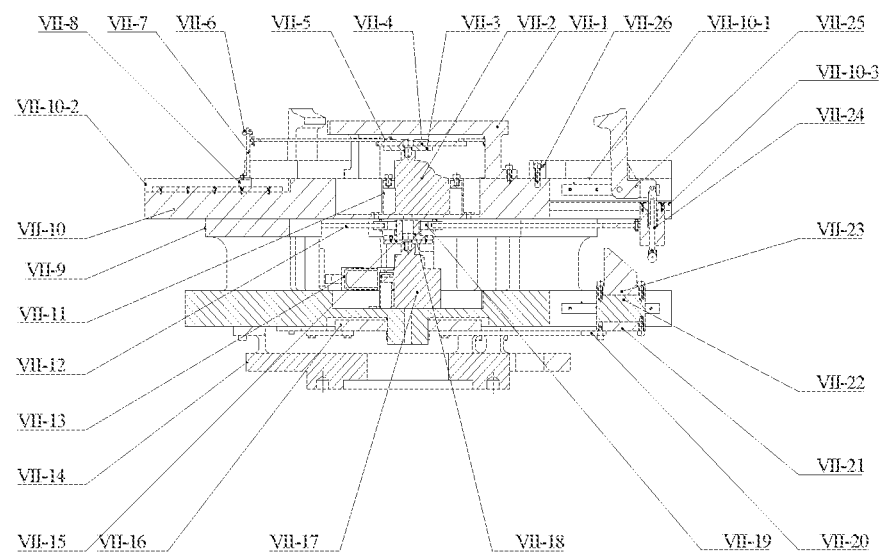
FIG. 5 is a cross-sectional view of a positioning system.
Figure 6:
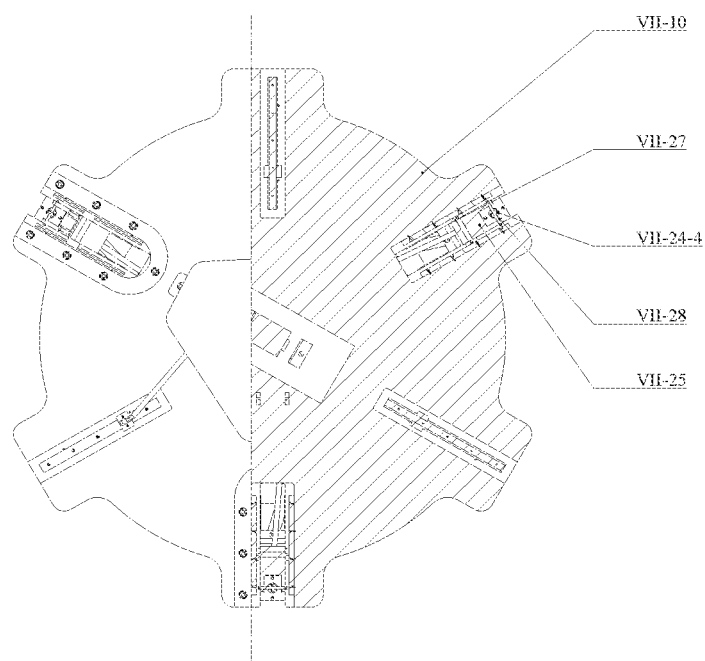
FIG. 6 is a partial cross-sectional view of a positioning system.
Figure 14:
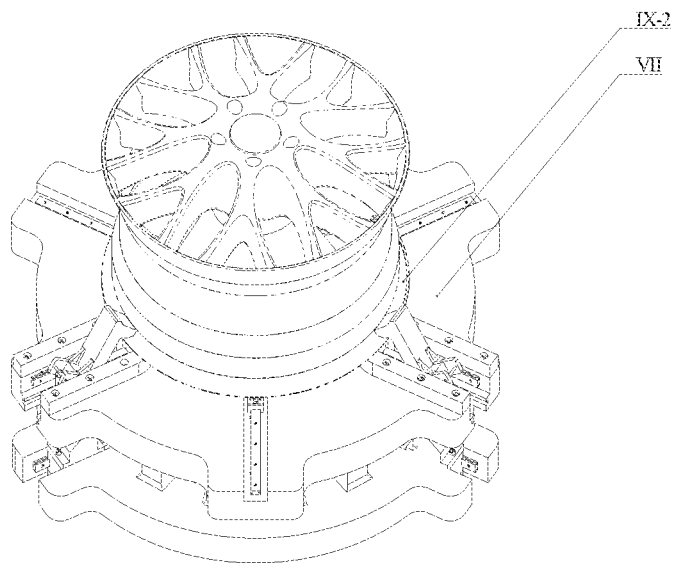
FIG. 14 is an axonometric drawing of a positioning system in a clamping state.
Figure 15:
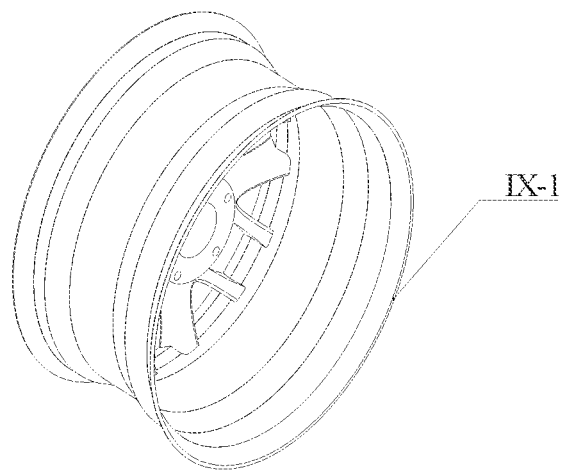
FIG. 15 is an axonometric view of a hub.

As shown in FIG. 5, FIG. 14, and FIG. 15, a positioning method of the positioning system VII is as follows. A lower surface IX-1 of the hub workblank IX is used as a main positioning reference surface. The lower surface IX-1 of the hub workblank IX comes into contact with the upper surfaces of three U-shaped blocks VII-26, to limit the rotation of the hub workblank IX along the X axis and the Y axis and the movement along the Z axis. A computer controls a main shaft of the steering engine VII-2 to rotate by a specific angle according to size data of the hub workblank IX-1 that is obtained by the automatic hub three-dimensional scanning apparatus III. The three L-shaped supports VII-7 are driven by the steering engine VII-2 to simultaneously move outward radially. The three screw-equipped ball heads VII-6 respectively mounted to the three L-shaped supports VII-7 come into point contact with the surface of the inner rim of the hub workblank IX, so as to limit the rotation of the hub workblank IX along the X axis and the Y axis. The rotation along the Z axis does not need to be limited.

A clamping method of the positioning system VII is as follows. The computer controls the main shaft of the steering engine VII-2 to rotate by a specific angle according to the size data of the hub workblank IX that is obtained by the automatic hub three-dimensional scanning apparatus III. The three top bar assemblies VII-24 and the three collets VII-25 connected thereto are driven by the steering engine VII-17 to move by a specific distance from outside to inside radially. The computer controls the piston rod of the cylinder VII-13 to protrude out, so as to cause the three wedges VII-23 to move radially from outside to inside. Inclined surfaces of the wedges VII-23 are tangent to the rollers VII-24-6 of the top bar assemblies VII-24. As the wedges VII-23 further move, the rollers VII-24-6 of the top bar assemblies VII-24 slide upward along the inclined surfaces relative to the wedges VII-23, so that the inner top bars VII-24-5 of the top bar assemblies VII-24 push the outer top bars VII-24-4 to rise vertically. Therefore, the springs VII-24-2 are compressed, and the collets VII-25 are rotated clockwise, and front surfaces VII-25-3 of the collets VII-25 come into contact with and compresses a hub rim upper surface IX-2. Thus, the clamping is completed.

When the hub workblank IX is to be released, the piston of the cylinder VII-13 is caused to retract, driving the wedges VII-23 to move inward radially. Therefore, springs VII-24-2 of the top bar assemblies VII-24 return, and the inner top bars VII-24-5 rapidly return by virtue of an elastic force of the springs VII-24-2, so that the collets VII-25 are rotated counterclockwise, thereby releasing the hub workblank IX. The computer controls the steering engines VII-2 and VII-17 to cause all of the apparatuses to return and wait for a next positioning and clamping command.

Figure 16:
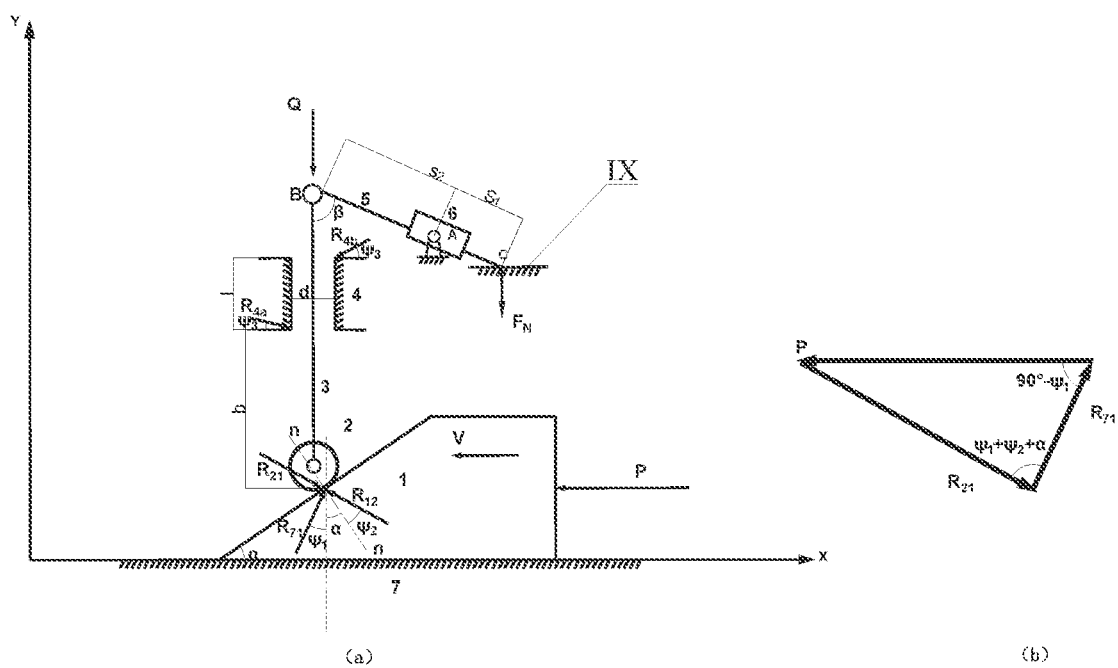
FIG. 16 is a simple diagram of a clamping mechanism of a positioning system and illustrates stress analysis.
Figure 17:
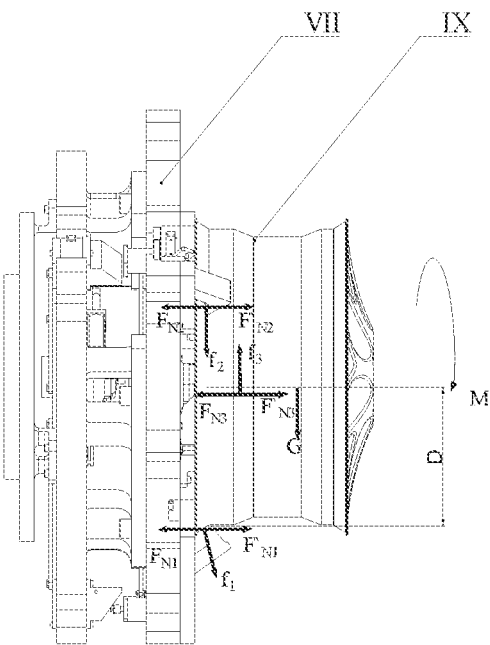
FIG. 17 illustrates stress analysis during machining of a hub.

FIG. 16 and FIG. 17 show analysis of a degree of freedom, that is, clamping reliability of the clamping mechanism of the positioning system VII. The positioning system VII clamps the hub workblank IX by using a wedge mechanism composed of the wedge VII-23, the top bar assembly VII-24, the collet VII-25, and the slider VII-27. A drawing of the mechanism is shown in FIG. 16(a). The wedge is simplified as a member 1. The roller VII-24-6 in the top bar assembly VII-24 is simplified as a member 2. The inner top bar VII-24-5 and the outer top bar VII-24-4 in the top bar assembly VII-24 are simplified as members 3. The outer housing VII-24-3 in the top bar assembly VII-24 is simplified as a rack 4. The collet VII-25 is simplified as a member 5. The slider VII-27 is simplified as a member 6. The linear guide rail used to guide the slider VII-22 on the lower mounting plate VII-9 is simplified as a rack 7. It is to be noted that, the since roller VII-24-6 in the top bar assembly VII-24 is rotated about an axis of the roller without affecting movement of other members, the degree of freedom is merely a local degree of freedom. Thus, the mechanism includes n=5 members, $P_l$=6 lower pairs, $P_h$=1 higher pair, and a local degree of freedom F'=1. A quantity of the degree of freedom of the mechanism is $3n-(2P_l+P_h)-F'=1$.

Stress analysis of the mechanism is shown in FIG. 16. $\psi_1$, $\psi_2$, and $\psi_3$ are friction angles. d is the inner diameter of the top bar assembly VII-24 outer casing VII-24-3. 1 is the height of the top bar assembly VII-24 outer shell VII-24-3. b is a vertical distance between the roller VII-24-6 of the top bar assembly VII-24 and the tangent point of the inclined plane of the wedge VII-23 and a bottom surface of the outer housing VII-24-3 of the top bar assembly VII-24. An active force (that is, thrust of the piston rod of the cylinder VII-14) on the member 1 is P. A resistance of the member 5 on the member 2 is Q, and is in a vertically downward direction. $R_{21}$ is a total reaction force of the member 2 on the member 1. $R_{71}$ is a total reaction force of the rack 7 on the member 1. According to the above stress analysis, as shown in FIG. 16(b), $R_{71}$ and $R_{21}$ may be respectively obtained according to a triangle principle of force of the member 1: $R_{71}$=Pcos$(\alpha+\omega_2)$/sin$(\alpha+\psi_1+\psi_2)$, and $R_{21}$=Pcos$\psi_1$/sin$(\alpha+\psi_1+\psi_2)$. $R_{4a}$ and $R_{4b}$ are support reaction forces of the rack 4 on the member 3. $R_{21}$ is a total reaction force of the member 1 on the member 2. If the member 2 and the member 3 are considered as a whole, the following three balance equations are obtained according to the principle of force balance and the principle of moment balance:

$$\sum F_X = (R_{4a} - R_{4b})\cos\psi_2 - R_{12}\sin(\alpha + \psi_2) = 0$$

$$\sum F_Y = R_{12}\cos(\alpha + \psi_2) - (R_{4a} + R_{4b})\sin\psi_3 - Q = 0$$

$$\sum M = R_{4a}1\cos\psi_3 + R_{4b}d\sin\psi_3 + \frac{Qd}{2} - R_{12}(b+1)\sin(\alpha + \psi_2) - \frac{R_{12}d\cos(\alpha + \psi_2)}{2}$$

According to the above equations, the following equation may be obtained:

$$Q = \frac{P\cos\psi_1}{\sin(\alpha+\psi_2+\psi_1)}\left[\cos(\alpha+\psi_2) - tg\psi_3 \times \sin(\alpha+\psi_2) \times \left(1 + \frac{2b}{l} - d\frac{tg\psi_3}{l}\right)\right]$$

Assuming that a point C on the member 5 exerts a vertically downward compression force on an upper surface IX-1 on the rim of the hub workblank IX. The principle of moment balance is applied to the member 5 at A, so that forces Q' and Q on the member 5 at B are equal but in opposite directions. Thus, $Q'S_2 \sin\beta = F_N S_1 \sin\beta$. Therefore, $F_N = Q'S_2/S_1$.

Thus, the compression force of one collet VII-25 on the hub workblank IX is:

$$F_N = \frac{S_2 P\cos\psi_1}{S_1\sin(\alpha+\psi_2+\psi_1)}\left[\cos(\alpha+\psi_2) - tg\psi_3 \times \sin(\alpha+\psi_2) \times \left(1 + \frac{2b}{l} - d\frac{tg\psi_3}{l}\right)\right]$$

As shown in FIG. 17, a cutting moment of a cutter on the hub workblank is M during the machining of the hub workblank IX. In order to avoid sliding between the hub workblank IX and the positioning system VII and change of an original centering position, a friction moment generated by the clamping force on the rim upper surface IX-2 is required to be greater than the cutting moment of the cutter on the hub workblank IX.

Assuming that each single collet VII-25 exerts a same compression force $F_N$ on the hub workblank IX, and a cutting moment generated by the cutter at a position farthest from the center of the hub workblank IX is M, according to a static balance condition, $M = 3\ \mu F_N D$, where D is a distance between a point of action of a friction force and a center of an inner hole of the hub. By substituting $F_N$ into the equation, a relationship between a driving force P and the cutting moment M may be obtained:

$$P = \frac{MS_1\sin(\alpha+\psi_1+\psi_2)}{3MDS_2\cos\psi_1[\cos(\alpha+\psi_2) - tg\psi_3 \times \sin(\alpha+\psi_2)(1+2b/l - dtg\psi_3/l)]}.$$

Thus, for reliable clamping, the active force (that is, the thrust of the cylinder VII-14) on the member 1 is required as follows:

$$P \geq \frac{MS_1\sin(\alpha+\psi_1+\psi_2)}{3MDS_2\cos\psi_1[\cos(\alpha+\psi_2) - tg\psi_3 \times \sin(\alpha+\psi_2)(1+2b/l - dtg\psi_3/l)]}.$$

Figure 18:
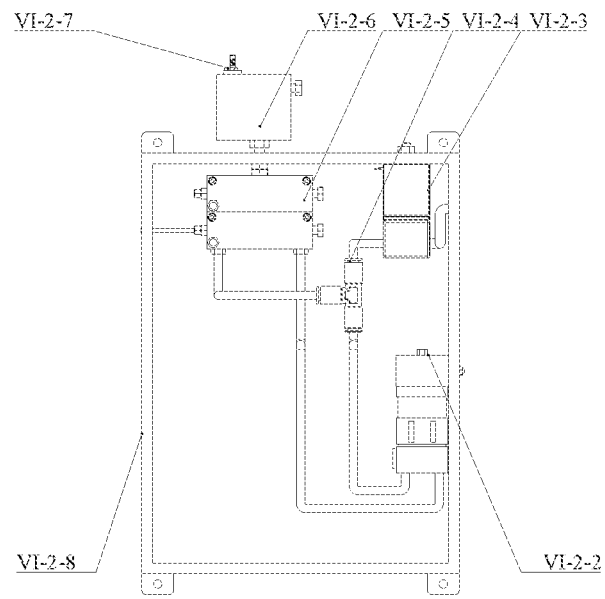
FIG. 18 is a front view of a micro-lubrication apparatus.

As shown in FIG. 18, the first horizontal lathe IV-1, the second horizontal lathe IV-2, and the machining center V all each are equipped with a micro-lubrication apparatus. The micro-lubrication apparatus VI-2 includes a nozzle VI-2-1, a pneumatic frequency generator VI-2-2, a solenoid valve VI-2-3, a tee joint VI-2-4, a micro pneumatic pump VI-2-5, an oil cup VI-2-6, a liquid level sensor VI-2-7, and a tank body VI-2-8. A pipeline passes through the solenoid valve VI-2-3 and is divided into two paths by the tee joint VI-2-4. One path directly communicates with the nozzle VI-2-1. An other path passes through the pneumatic frequency generator VI-2-2 and then communicates with the micro pneumatic pump VI-2-5.

The solenoid valve VI-2-3 is configured to control a gas path to open or close. The micro pneumatic pump VI-2-5 is configured to pump a small amount of lubricating oil. The pneumatic frequency generator VI-2-2 is configured to generate an electrical signal to control the micro pneumatic pump VI-2-5 to turn on/off. The liquid level sensor VI-2-7 is mounted in the oil cup VI-2-6, and is configured to detect an oil level in the oil cup VI-2-6. If the liquid level in the oil cup VI-2-6 is excessively low, the computer controls the micro-lubricating oil supply tank VI-1 to inject oil into the oil cup VI-2-6.

Figure 19:
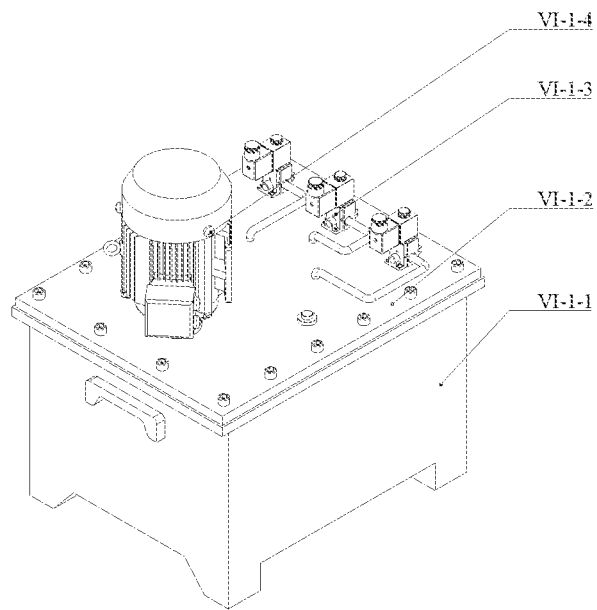
FIG. 19 is an axonometric view of a micro-lubricating oil supply tank.
Figure 20:
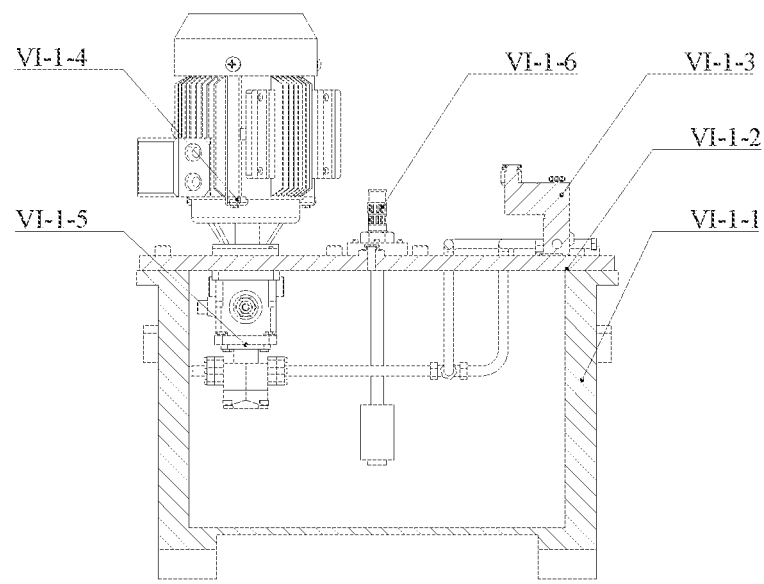
FIG. 20 is a cross-sectional view of the micro-lubricating oil supply tank.

As shown in FIG. 19 and FIG. 20, the micro-lubricating oil supply tank is composed of a tank body VI-1-1, a tank cover VI-1-2, a solenoid valve VI-1-3, a liquid level controller VI-1-6, a hydraulic oil pump-specific motor VI-1-4, and a hydraulic oil pump VI-1-5. The hydraulic oil pump VI-1-5 is mounted in the tank body VI-1-1. The motor VI-1-4 specific for the hydraulic oil pump VI-1-5 is mounted to the tank cover VI-1-2, and is connected to the hydraulic oil pump VI-1-5. A pipeline of an oil outlet of the hydraulic oil pump VI-1-5 is connected to a cross joint. The pipeline is divided into three paths. The three paths are connected to the solenoid valve VI-1-3 and then connected to the oil cup VI-2-6 of the micro-lubrication apparatus VI-2.

Figure 21:
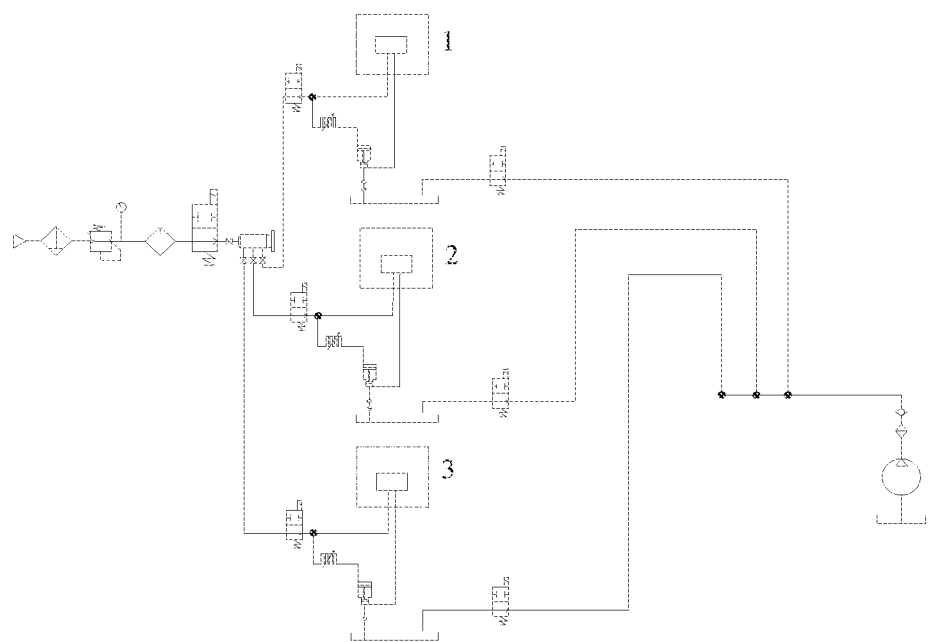
FIG. 21 is an oil-gas loop diagram of the micro-lubrication apparatus and the micro-lubricating oil supply tank.

FIG. 21 shows an oil-gas loop of the micro-lubrication apparatus VI-2 and the micro-lubricating oil supply tank VI-1. Execution elements 1, 2, and 3 are respectively disposed on the nozzles VI-2-1 in the first horizontal lathe IV-1, the second horizontal lathe IV-2, and the machining center V. A compressed gas is filtered by a gas source triple and then passes through the solenoid valve and a gas distributor to enter the three micro-lubrication apparatuses VI-2. The compressed gas passes through the solenoid valve VI-2-3 and is divided into two paths. A part of the gas reaches the nozzles VI-2-1, and an other part of the gas passes through the pneumatic frequency generator VI-2-2 to control the micro pneumatic pumpVI-2-5 to pump a small amount of lubricating oil to the nozzles VI-2-1. The compressed gas and the small amount of the lubricating oil are mixed into oil mist and sprayed at the nozzles VI-2-1. The lubricating oil pumped by the hydraulic oil pump VI-1-5 from the tank body VI-1-1 passes through the three solenoid valves VI-1-3 and then enter the oil cups VI-2-6 in the three micro-lubrication apparatuses VI-2.

It is to be noted that, power elements of the micro-lubrication apparatus VI-2 and the micro-lubricating oil supply tank VI-1 are separately connected to a computer. The computer controls the micro-lubrication apparatus VI-2 to open/close according to an automatically planned machining path for the hub workblank IX, so that a cooling liquid can be accurately and timely sprayed to a cutting area. Therefore, the consumption of the cutting fluid is reduced and the machining precision of the hub is improved.

TABLE 1 a machining process plan of an automobile hub.

| Operation No. | Operation name | Operation content | Machining device |
|---|---|---|---|
| 10 | Turning | Rough turning of part of outer rim, tire mount, front side of spoke, and front side of mounting disc | First horizontal lathe |
| 20 | Turning | Rough turning of remaining outer rim, bead seat, inner rim, back side of spoke, and back side of mounting disc | Second horizontal lathe |
| 30 | Turning | Semi-finish turning and finish turning of part of outer rim, tire mount, front side of spoke, and front side of mounting disc | First horizontal lathe |
| 40 | Turning | Semi-finish turning and finish turning of remaining outer rim, bead seat, inner rim, back side of spoke, and back side of mounting disc | Second horizontal lathe |
| 50 | Drilling, milling, and reaming | Drilling and reaming of center hole, mounting hole, and valve hole, and milling of spoke tuyere | Machining center |
| 60 | Final inspection | Checking according to inspection operation sheet | |

What is claimed is:

1. A system for positioning an automobile hub, the system comprising an upper mounting plate and a lower mounting plate that are connected in an up-down direction and spaced apart by a specific distance, wherein at least three U-shaped blocks are circumferentially fixed on a top surface of the upper mounting plate, an L-shaped support is mounted between every two adjacent U-shaped blocks, a screw-equipped ball head is disposed on the L-shaped support, the L-shaped support is driven by a first driving apparatus to move radially along the upper mounting plate, a slidable chuck is disposed in each U-shaped block, a push rod assembly is connected to a bottom of each chuck, the push rod assembly is driven by a second driving apparatus to move radially along the upper mounting plate together with the chuck, wedges of a quantity of the push rod assemblies are circumferentially fixed on a top surface of the lower mounting plate, the wedges are driven by a third driving apparatus to move radially along the lower mounting plate, and inclined surfaces of the wedges are mated with bottoms of the push rod assemblies.

2. The system for positioning an automobile hub according to claim 1, wherein the push rod assembly comprises an outer housing, an end cover, a spring, an outer push rod, an inner push rod, a connecting member, and a roller, the end cover is fixed on a top surface of the outer housing, the inner push rod is mounted in the outer push rod, the outer push rod is sleeved on the inner push rod and is axially positioned by using a shaft collar of the inner push rod, the spring is coaxially mated with the outer push rod, and is axially positioned by using the shaft collar of the inner push rod, the outer push rod penetrates the end cover to be connected to the chuck, a lower end of the inner push rod protrudes from the outer housing to be fixedly connected to the connecting member, and the roller is mounted to the connecting member.

3. The system for positioning an automobile hub according to claim 2, wherein through grooves are provided on the end cover, a plurality of rollers are mounted in each through groove in an up-down direction, and the rollers are connected to the end cover.

4. The system for positioning an automobile hub according to claim 1, wherein the first driving apparatus comprises a steering engine mounted to a center of the upper mounting plate, a steering engine arm is mounted to the steering engine, a flange plate is fixedly connected to the steering engine arm and is connected to all of the L-shaped supports by using a link, and the L-shaped supports are mounted to a first linear guide rail.

5. The system for positioning an automobile hub according to claim 1, wherein the second driving apparatus comprises a steering engine mounted to a center of the lower mounting plate, a steering engine arm is mounted to the steering engine, a reel is fixedly connected to the steering engine arm, a connecting member is fixedly mounted to the reel, one end of a link is connected to the connecting member, and an other end of the link is connected to an outer housing of the push rod assembly.

6. The system for positioning an automobile hub according to claim 1, wherein three square grooves are circumferentially provided on the lower mounting plate, a linear guide rail is fixed in each square groove, the wedges are disposed in the linear guide rails, the third driving apparatus is a cylinder, the cylinder is fixed on the lower mounting plate, and a piston rod of the cylinder is connected to the wedge.

7. The system for positioning an automobile hub according to claim 6, wherein a cylindrical boss is disposed at a center of a bottom surface of the lower mounting plate and is mated with a disc, one ends of three links are connected to the disc, other ends of the links are connected to three working plates, each working plate is fixed to a bottom of a slider on the linear guide rail, a thickness of the each working plate is a vertical distance from a bottom surface of each slider to a bottom surface of the lower mounting plate, and the cylinder, the wedge, the slider, the working plate, the link, and the disc jointly form a slider-crank mechanism.

8. A production line for intelligent cleaning and precision machining of an automobile hub, the production line comprising the system for positioning an automobile hub according to claim 1.

9. The production line for intelligent cleaning and precision machining of an automobile hub according to claim 8, the production line further comprising a micro-lubrication apparatus, wherein the micro-lubrication apparatus comprises a nozzle, a pneumatic frequency generator, a solenoid valve, a tee joint, a micro pneumatic pump, an oil cup, and a liquid level sensor, a pipeline passes through the solenoid valve and is divided into two paths by the tee joint, one path directly communicates with the nozzle, an other path passes through the pneumatic frequency generator and then communicates with the micro pneumatic pump, the solenoid valve is configured to control a gas path to open or close, the micro pneumatic pump is configured to pump a small amount of lubricating oil, the pneumatic frequency generator is configured to generate an electrical signal to control the micro pneumatic pump to turn on/off, and the liquid level sensor is mounted in the oil cup to detect an oil level of the oil cup.

10. The production line for intelligent cleaning and precision machining of an automobile hub according to claim 9, the production line further comprising an unloading rack, a first robot, a loading rack, a second robot, an automatic hub three-dimensional scanner, a first horizontal lathe, a second horizontal lathe, and a machining center, the unloading rack, the first horizontal lathe, the second horizontal lathe, the machining center, and the automatic hub three-dimensional scanner are circumferentially arranged around the second robot, linear distances between the second robot and the first horizontal lathe, the second horizontal lathe, and the machining center are a same fixed value, and the loading rack and the first robot are disposed beside the automatic hub three-dimensional scanner, and the system for positioning an automobile hub is mounted in the first horizontal lathe.

* * * * *